US011631266B2

(12) United States Patent
Sampath et al.

(10) Patent No.: US 11,631,266 B2
(45) Date of Patent: Apr. 18, 2023

(54) AUTOMATED DOCUMENT INTAKE AND PROCESSING SYSTEM

(71) Applicant: Wilco Labz Inc., Santa Clara, CA (US)

(72) Inventors: Aravind Sampath, Fremont, CA (US); Sri Kedarnath Relangi, Sunnyvale, CA (US); Suresh Kankanala, San Ramon, CA (US); Sundararaman Ramasamy, Novato, CA (US)

(73) Assignee: Wilco Source Inc, Santa Clara, CA (US)

( * ) Notice: Subject to any disclaimer, the term of this patent is extended or adjusted under 35 U.S.C. 154(b) by 258 days.

(21) Appl. No.: 16/836,024

(22) Filed: Mar. 31, 2020

(65) Prior Publication Data

US 2020/0342221 A1 Oct. 29, 2020

Related U.S. Application Data

(60) Provisional application No. 62/828,379, filed on Apr. 2, 2019.

(51) Int. Cl.
*G06K 9/00* (2022.01)
*G06N 3/08* (2006.01)
(Continued)

(52) U.S. Cl.
CPC ......... *G06V 30/413* (2022.01); *G06K 9/6217* (2013.01); *G06N 3/08* (2013.01);
(Continued)

(58) Field of Classification Search
CPC .. G06K 9/6217; G06V 30/413; G06V 30/412; G06V 30/10; G06V 30/12;
(Continued)

(56) References Cited

U.S. PATENT DOCUMENTS 5,097,517 A 3/1992 Holt
6,789,069 B1 9/2004 Barnhill et al.
(Continued)

OTHER PUBLICATIONS

Bodla et al., Improving Object Detection With One Line of Code. Center for Automation Research, University of Maryland, College Park. Aug. 8, 2017.

*Primary Examiner* — Bobbak Safaipour
*Assistant Examiner* — Duy Tran
(74) *Attorney, Agent, or Firm* — Intellent Patents LLC; Ahmed Alhafidh

(57) ABSTRACT

An automated documentation intake and processing system involves pre-processing source images of intake documents and applying a YOLO CNN model to identify fields of interest (FOIs) therein which may contain target data. The system classifies FOIs and upsamples the contents in order to digitize and extract target data. The system may be trained to differentiate between target data and non-target data and incorporates an adjustable confidence scores which reflects the system's degree of accuracy at predicting the correct FOI (e.g., name, address, insurance number, vehicle registration number). The system is pre-trained to detect a subset of documentation types, form fields, and form field types. However, the system is configured to adapt to variations of the same types of documentation, such as different insurance cards or driver licenses from different states.

13 Claims, 6 Drawing Sheets

(51) Int. Cl.
*G06N 7/00* (2006.01)
*G06K 9/62* (2022.01)
*G06V 30/413* (2022.01)
*G06V 30/412* (2022.01)
*G06V 10/40* (2022.01)
*G06V 30/10* (2022.01)

(52) U.S. Cl.
CPC ........... *G06N 7/005* (2013.01); *G06V 30/412* (2022.01); *G06V 10/40* (2022.01); *G06V 30/10* (2022.01)

(58) Field of Classification Search
CPC .. G06V 30/133; G06V 30/14; G06V 30/1444; G06V 30/1448; G06V 30/147; G06V 30/153; G06V 30/1613; G06V 30/18; G06V 10/40; G06V 30/41; G06V 30/22; G06V 30/224; G06V 30/2253; G06V 30/24; G06V 30/242; G06V 30/245; G06V 30/26; G06V 30/28; G06V 30/302; G06V 10/70; G06V 10/766; G06V 30/191; G06N 3/08; G06N 3/10; G06N 3/12; G06N 5/00; G06N 7/00; G06N 7/005
See application file for complete search history.

(56) References Cited

U.S. PATENT DOCUMENTS

| | | |
|---|---|---|
| 7,149,347 B1 | 12/2006 | Wnek |
| 7,798,417 B2 | 9/2010 | Snyder et al. |
| 8,385,589 B2 | 2/2013 | Erol et al. |
| 8,520,888 B2 | 8/2013 | Spitzig et al. |
| 8,540,158 B2 | 9/2013 | Lei et al. |
| 8,655,803 B2 | 2/2014 | Lecerf et al. |
| 8,958,605 B2 | 2/2015 | Amtrup et al. |
| 8,965,134 B2 | 2/2015 | Kompalli et al. |
| 8,996,350 B1 | 3/2015 | Dub et al. |
| 9,098,888 B1 | 8/2015 | Lin et al. |
| 9,152,883 B2 | 10/2015 | Urbschat et al. |
| 9,298,981 B1 | 3/2016 | Ragnet et al. |
| 9,396,388 B2 | 7/2016 | Amtrup et al. |
| 9,430,453 B1* | 8/2016 | Ho ................. G06F 40/226 |
| 9,442,928 B2 | 9/2016 | Szucs et al. |
| 9,483,794 B2 | 11/2016 | Amtrup et al. |
| 9,547,804 B2 | 1/2017 | Nirenberg et al. |
| 9,652,688 B2 | 5/2017 | Jean et al. |
| 10,157,331 B1* | 12/2018 | Tang ................. G06V 20/00 |
| 2005/0004885 A1 | 1/2005 | Pandian et al. |
| 2005/0259866 A1* | 11/2005 | Jacobs ............... G06V 30/153 382/229 |
| 2007/0013967 A1 | 1/2007 | Ebaugh et al. |
| 2007/0168382 A1 | 7/2007 | Tillberg et al. |
| 2007/0257934 A1 | 11/2007 | Doermann et al. |
| 2011/0078191 A1* | 3/2011 | Ragnet ............. G06V 30/1444 707/E17.039 |
| 2013/0246430 A1 | 9/2013 | Szucs et al. |
| 2014/0168478 A1* | 6/2014 | Baheti ................ G06V 10/235 348/240.99 |
| 2017/0147905 A1* | 5/2017 | Huang ............... G06K 9/6257 |
| 2017/0200065 A1* | 7/2017 | Wang .................. G06V 10/82 |
| 2018/0018553 A1* | 1/2018 | Bach .................. G06F 40/279 |

* cited by examiner

AUTOMATED DOCUMENT INTAKE AND PROCESSING SYSTEM

CLAIM OF PRIORITY

The present application claims benefit of U.S. Provisional Patent Application Ser. No. 62/828,379, titled AUTOMATED DOCUMENT INTAKE AND PROCESSING SYSTEM, filed Apr. 2, 2019, the entire disclosure of which is hereby expressly incorporated by reference herein.

FIELD OF TECHNOLOGY

This specification relates generally to form processing software. More particularly, the disclosure pertains to an automatic document processing and intake system which is trained to classify individual fields of interest (FOIs) containing target client data within client documentation and automate extraction of the same.

BACKGROUND

Client intake throughout business sectors (e.g., hospitals/clinics, real estate agencies, financial services, supply chain management, law firms, engineering firms, utility providers, manufacturing factories) often requires processing extensive documentation, such as medical history, insurance information, CAD illustrations, profit/loss statements, loan documents, lease documents, shipping manifests, case histories, and more. Within certain locales, these documents are typically standardized/templatized in order to facilitate the intake process. This makes it easier for the client to provide consistent information and makes it easier for intake processors to validate the information and integrate it into their respective system. Intake processors are typically human, but it may be common to also employ optical character recognition (OCR) and machine vision (MV) processing techniques to recognize and extract desired information from templates.

The legibility of forms completed in handwriting can vary widely, making it difficult for human intake processors and OCR/computer precision software to consistently and accurately extract substantive information from form fields. Since computer software systems have limited applicability in high-risk environments, organizations rely on trained human processors with or without the aid of software automation. A precise intake process is vital, not only to maintain the integrity of the record but to support the due diligence of the service provider, such as a physician or an attorney. In the case of digital intake processors, over-reliance on faulty data recognition software may, for example, cause a patient's electronic health record (EHR) to be incorrectly recorded, a case's evidence to be mischaracterized, an individual's statements to irreconciled, and other serious accidents. This can cause a physician caring for a patient to misdiagnose the patient's condition or fail to factor in, for example, a heart condition not mentioned in the EHR or an incorrectly identified drug allergy. Or, a loan processor may inadvertently decline a loan provision due to a mischaracterized income statement.

Thus, there exists a need for an automated documentation intake and processing system which utilizes a trainable model for accurately and efficiently detecting, classifying, and extracting desired data from the fields of a completed form or other documentation based on a standardized template, a customized template, or a machine-learning compatible template.

SUMMARY

Various aspects of an automated document intake and processing system and method have been claimed. One aspect involves receiving, by a processor of a computing device, one or more source image(s) which comprise one or more intake documents. These intake documents are part of a client's documentation which are expected to be digitized and organized in an administrative fashion. One or more pre-processing steps are applied to render the source image(s) to input image(s). A pre-trained "you only look once" (YOLO) convolutional neural network (CNN) is applied to the input image(s) to render them to target image(s). The YOLO CNN applies one or more filters to the input image(s) and generates a probability map associated with one or more FOIs present in the input image(s). The YOLO CNN further classifies the FOI(s) as comprising one or more of non-target data and target data. Furthermore, the FOI(s) are upsampled and digitized and any target data therein is extracted.

BRIEF DESCRIPTION OF THE DRAWINGS

FIG. 5 shows a user interface view of the intake system depicting extracted target data.

FIG. 6 shows a user interface view of the intake system depicting corrections made to extracted target data.

DETAILED DESCRIPTION

Figure 1:
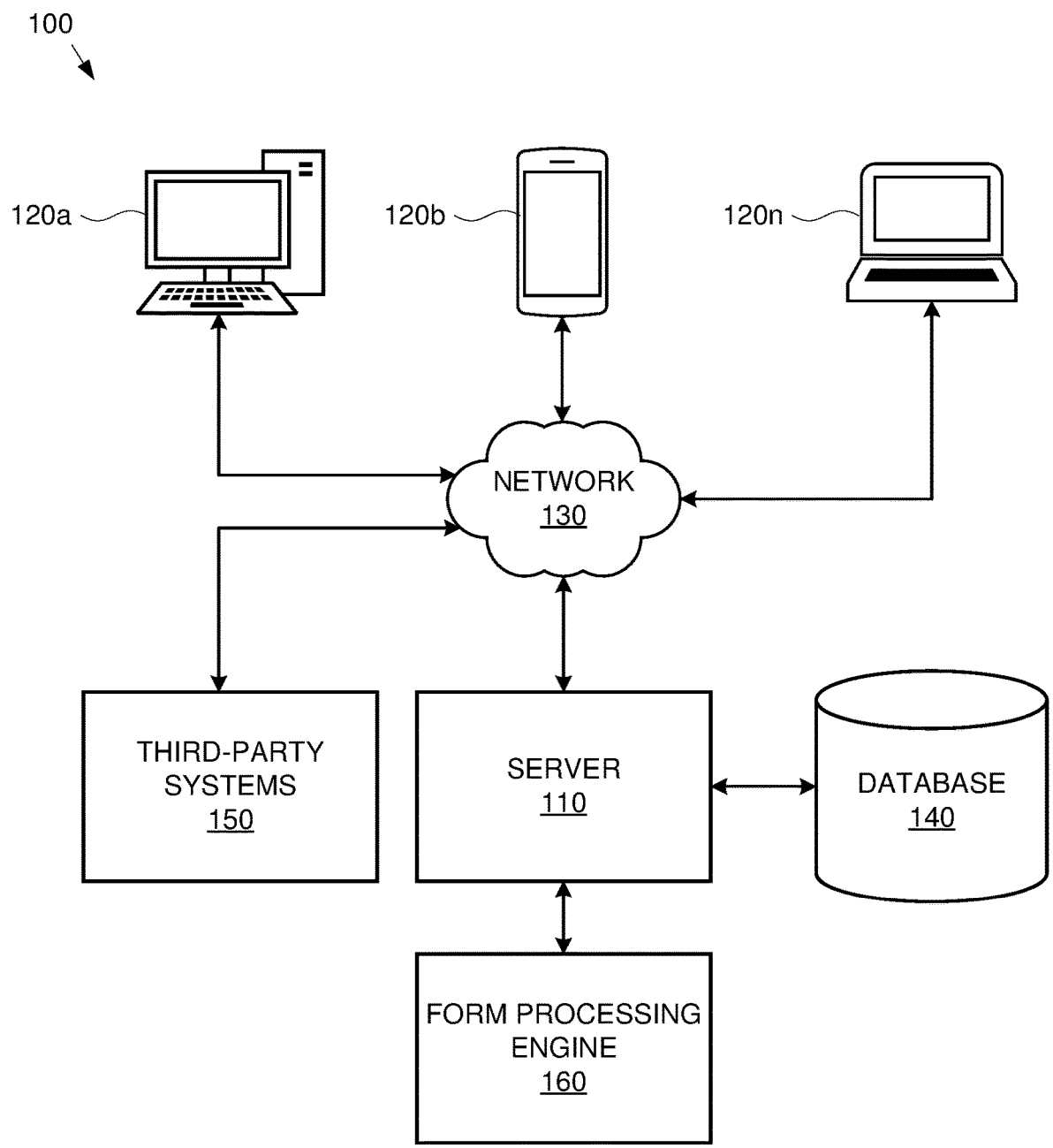
FIG. 1 shows a block diagram of an exemplary automated document intake and processing system.

Various applications, methods, and systems are disclosed herein, including computer programs encoded on computer storage media, for automating processing, validation, and digital integration of handwritten forms and accompanying identification documentation. The disclosed embodiments may for example be encompassed in a server accessible via a client application, which may be installable and executable on user devices such as workstations, personal computers, smartphones, or tablets. Additionally, or alternatively, the client application may be available as one or more web application(s), accessible via a client device accessing the web application(s) through, for example, an internet browser.

The system provides an improved document intake and processing workflow involving a combination of raw image pre-processing, MV processing, OCR, template matching, document segmentation, and data extraction steps. This workflow improves the quality of input documentation and drastically increases the accuracy of processing algorithms by attenuating the stochastic nature of forms completed via handwriting. Additionally, feedback received by an intake processor may introduce an added layer of accountability and may further improve processing accuracy.

The system may utilize, in part, one or more trained neural network models to infer which portions of received forms contain sensitive data. These models may be adjustably configured to learn how to detect recurring field patterns across multiple versions of, for example, the same identification document, such as state government ID, insurance ID, or enterprise ID. Even with a limited number of variations, the system may be capable of learning to differentiate desired data to be extracted from around undesired data which may merely delineate desired data. Finally, the system backpropagates user-provided corrections and adjusts field pattern detection and data extraction accordingly.

DEFINITIONS

As used herein, the term "documentation" may refer broadly to any written or digitized information pertaining to a client's identification, demographics, or other information gathered by a business. For the system to properly parse the documentation, the documentation may be a file (preferably a raw image such as CRW, CR2, NEF, NRW, ARW, SRF, SR2, PEF, PTX, RAF, DCS, DCR, DRF, K25, KDC, RAW, RW2,RWL, DNG, SRW, X3F, but also other formats such as RGB, JPG, JPEG, PNG, HTML, GIF, BMP, DOCX, PDF, AI, PSD, SVG, PPT, etc. are within the scope of the exemplary embodiments) created and stored by an intake processor. Exemplary documentation includes, but is not limited to: new client applications, loan documents, invoices, aviation log books, personal and family medical history, vaccination record, insurance cards, and government-issued identification. It will be appreciated that multiple documents having varying dimensions and/or file types may be involved throughout any process of the automated intake workflow described herein. Multiple document types may be discretely processed or combined and processed as a whole. It will be further appreciated that the term documentation is intended to include metadata and files associated with a document, such as waivers, releases, licenses, addendums, etc.

A "provider" may refer to any entity providing a service which involves, inter alia, form intake and processing.

An "intake processor" may refer to any human and/or computer system involved in integrating client information from completed forms into a digital information processing system. As such, an intake processor can include an automatic document scanner, a processing employee, a cloud storage facility, or any combination of human and/or digital processors.

A "client" may refer to an entity seeking a service from a provider and typically has documentation which comprises information desired to be extracted, organized in an information system, and utilized by the provider. Examples may include, but not be limited to: a patient seeking the care of a health provider (e.g., physician, dentist), a potential investor seeking the guidance of a financial advisor, a business owner seeking accounting or bookkeeping services, and a future homeowner seeking the due diligence of a real estate agent.

A "field of interest" (FOI) may refer to any portion of documentation which is expected to recur, e.g., a text box in which a first name should be handwritten, a checkbox for selecting gender.

"Target data" may refer to information which is desired to be integrated into an information system. It is expected that the integrity of target data must be fully guaranteed to prevent any chance that corrupted target data may influence a professional's decision.

"Non-target data" may refer to information which is not desired to be integrated into an information system. Non-target data can include physical constraints on portions of documentation, field identification, instructions, and other information which may obscure, limit, or otherwise encompass target data.

A "segment" may refer to one of one or more individually processed parts of a multi-unit documentation. For example, in a multi-page document, a segment may refer to a single page. If the documentation contains multiple types of transactional units (e.g., demographics, medical history, employment record, waiver, bank information, income statements, invoices), each unit may be considered a separate segment. Each segment may comprise one or more FOIs containing target data and/or non-target data.

Referring to FIG. 1, a block diagram of an exemplary automated document intake and processing system 100 ("intake system") is illustrated. As shown, the intake system 100 comprises any number of user devices (120a, 120b, 120n) operated by various users (e.g., providers, clients, intake processors, etc.) and accessing a server 110 via a network 130 (e.g., Internet, LAN, cellular, intranet, etc.). As discussed below, a user device may be any device capable of accessing the server 110, such as by running a client application or other software, such as a web-based application accessible through a browser. Exemplary user devices 120a-n include, but are not limited to, general purpose computers, desktop workstations, laptops, cell phones, smart phones, personal digital assistants, televisions, tablets, and the like.

The server 110 may be adapted to receive, determine, record and/or transmit information for any number of users. The server 110 may store received or determined information in, for example, a database 140. Such information may be manually entered or selected by a user via an online, mobile or desktop application. Such information may additionally or alternatively be automatically received from any device, including, for example, thin client devices which may serve as input processing endpoints in an integrated system of devices, i.e., Internet of Things (IoT) devices. Such IoT devices may be capable of performing at least a subset of the functions of a regular user device and may be particularly oriented to the unique workflow within an institution's intake system. For example, a user device may be a networked scanner which can receive client documentation, apply one or more pre-processing steps, and communicate the pre-processed input to the server 110 or forward the pre-processed input to the next stage of digital and/or human processing. Such a simple device may be, for example, provided in an establishment's lobby, waiting rooms, reception, office desks, conference rooms, or other areas. Individual IoT processing devices may be trained according to the unique needs of the environment in which they're placed.

The server 110 may also be communicatively coupled to, or include as a subset of the server's hardware and/or software provisions, a form processing engine 160. The form processing engine 160 may utilize one or more neural networks encoding one or more pre-trained models. The trained models may be pre-trained and/or continuously retrained according to one or more training methods. The models may be trained to receive one or more (typically pre-processed) inputs and infer one or more outputs. Generally, an input will comprise of one or more segments of a client's documentation. A typical output may include pre-processed images having one or more detected fields associated with unique keys for later validation and refinement.

The form processing engine 160 may be separated from the server 110 in order to insulate the form processing engine 160 and the contents thereof from the server 110 and subsequently, the network 130. In a typical scenario, a client application executable through a user device 120a-n may transmit documentation to the server 110 through the network 130, which documentation may be handled by the form processing engine 160. The form processing engine 160 may respond by transmitting an output (e.g., a result of an inference task) to the server 110, which reply may be transmitted to the database 140 for storage and/or transmitted back to the corresponding user device 120.

In one embodiment, the server 110 may be connected to one or more third-party systems 150 via the network 130. Third-party systems 150 may store information in one or more databases that may be accessible by the server 110. Third-party systems 150 may include, but are not limited to, clinic/hospital administration systems, EHR or EMR management systems, docketing software, insurance firm claim handling systems, regulatory bodies, federal agencies, financial institutions, higher education institutions or any other stakeholders which may be involved in managing an individual's sensitive information.

The server 110 may be capable of retrieving and/or storing information from third-party systems 150, with or without user interaction. Moreover, the server 110 may be capable of transmitting stored information to third-party systems 150, and may notify users of such communications. It will be appreciated that all transactions communicated between the server 110 and third-party systems 150 relating to client information are in accordance with PI, PCI, HIPAA regulations, GDPR, i.e., data privacy and security is fully guaranteed when sharing personal, financial or, PIPEDA medical information.

Figure 2:
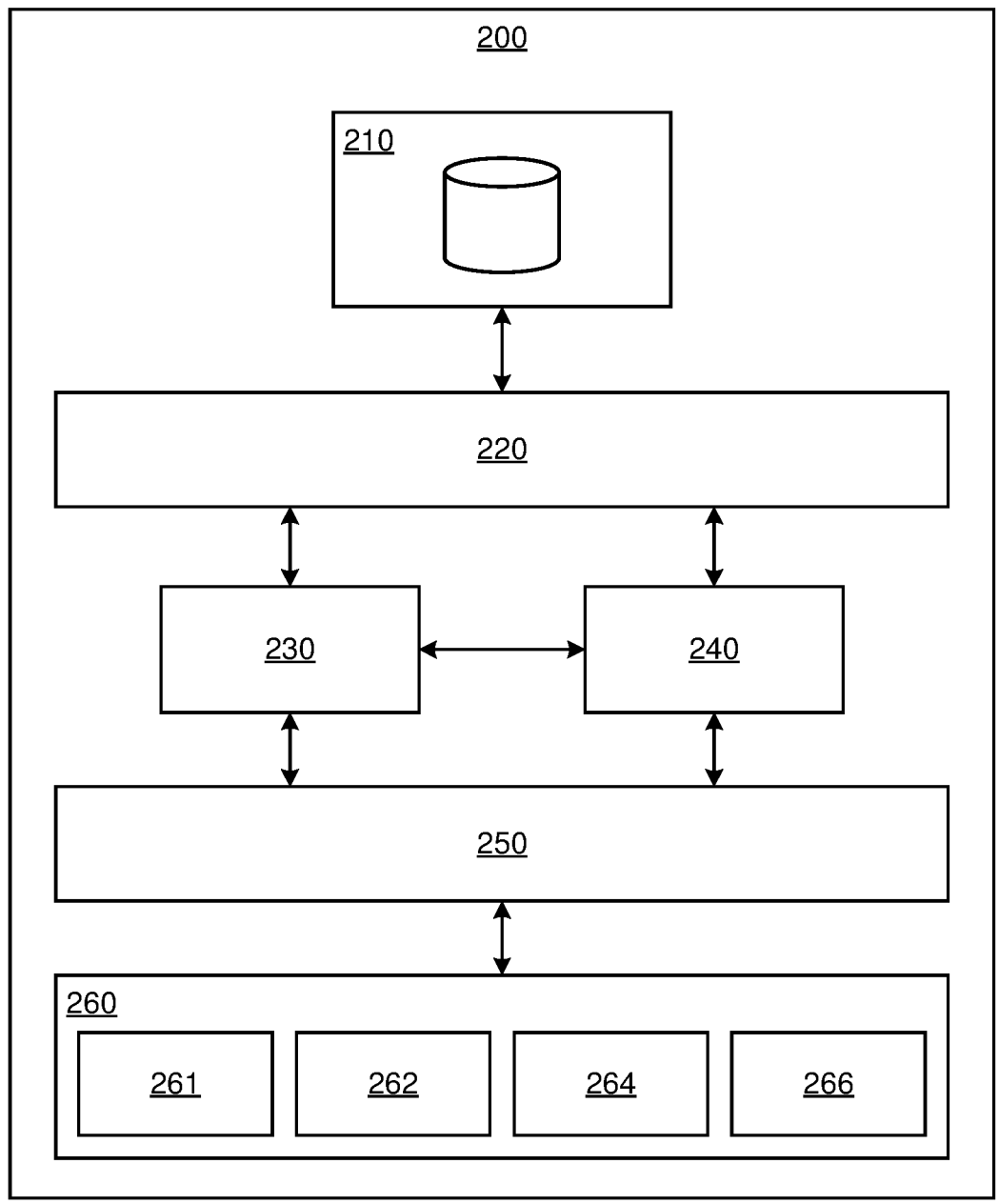
FIG. 2 shows a block diagram of an exemplary server for use in an automated document intake and processing system.

As shown in FIG. 2, the system may be entirely or partially implemented on one or more servers 200 each comprising hardware 260 such as any number of random access memory ("RAM") 261, processor modules 262 (e.g., graphics processing units, tensor processing units), and internal or external memory 264. The server 200 may include a network interface 266 such that it may access the network to send or receive information.

The server 200 may access a central data store 210 having at least one database 211. It will be appreciated that the database 211 may be internal to the server 200 or may be accessed by the server over the network or via another wired or wireless connection. The server may store desired or required information in the database 210 and may access the same to retrieve the information.

In certain embodiments, the database 210 may be in communication with an object relational mapping ("ORM") 220, also known as an object relational model or object-relational database management system. The ORM 220 may be in communication with a Universal Resource Indicator ("URI") 230 mapper and/or an application programming interface ("API") 240.

The URI mapper 230 may map a URI into a pointer to an internal program, view, logic, or presentation of data within the system, based on one or more rules of a matching object specified in a collection of mapping objects. The URI mapper 230 may be in communication with a web server.

The API 240 may be in communication with a web server as to send and/or receive data to/from user devices communicating with the server using HTTP and/or HTTPS. The API 240 may prepare data stored in the database 210 for delivery to a client device or may prepare data received from a client device for storage in the database 210. The API 240 may be capable of translating between formats including, but not limited to JSON, XML and the like. The API 240 may be capable of automatically generating URIs based upon data structures observed in the ORM 220 for access by client devices.

A web server 250 may be adapted to deliver web pages on request to users using the Hypertext Transfer Protocol (HTTP and/or HTTPS) or similar protocols. This allows for delivery of HTML documents and any additional content that may be included by a document, such as images, style sheets and scripts.

In one embodiment, a user or client device may employ a web browser or similar client application to engage in communication with a web server 250. For example, a client application may make a request for a specific resource using HTTP/HTTPS and the web server may respond with the content of that resource or an error message if unable to do so. The resource may be data or a file stored in a database. The web server can receive content from a user, possibly using HTTP/HTTPS.

Figure 3:
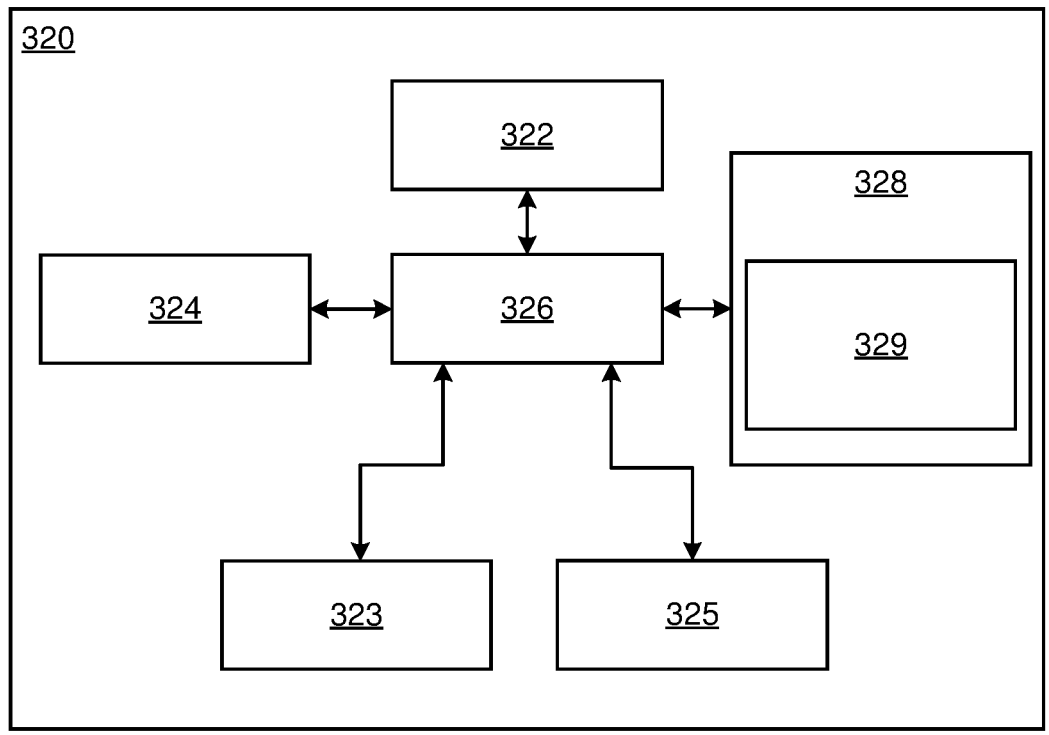
FIG. 3 shows a block diagram of an exemplary user device for use in an automated document intake and processing system.

Referring to FIG. 3, a user device 320 is illustrated. Exemplary user devices include, but are not limited to, general purpose computers, laptops, cell phones, smart phones, personal digital assistants, televisions, tablets, Raspberry Pi, and the like.

As shown, the user device 320 may comprise one or more wireless and/or wired network interface modules 322, one or more camera modules 323, one or more display modules 324, one or more user input interfaces 325, one or more processor modules 326 and/or one or more memory modules 328. Additional modules may include an input/output device or a tensor processing unit.

Each user device 320 may have one or more client applications 329 stored in its memory module 328 and executable by the processor module 326, where each client application 329 may be adapted to communicate with an automated documentation intake and processing system running on the server 310 over, for example, a network. Additionally, or alternatively, the client applications 329 may be available as one or more web applications, accessible via the client device 320 having an internet browser. Such configurations may allow users of client applications 329 to input information and/or interact with the automated documentation intake and processing application from any location that allows for access to the server 310.

As discussed in detail below, exemplary client applications 329 may allow for automatic processing, validation, and integration of client documentation through, in one or more embodiments: pre-processing raw images of client documentation, segmenting the raw images of client documentation, training a YOLO (you-only-look once) convolutional neural network (CNN) for entity detection and image labeling using a known training dataset (or utilizing a pre-trained YOLO CNN model), applying the YOLO CNN to segments of client documentation to detect and classify standardized fields, upsample the segmented images, consolidate segmented images and apply digital recognition, extract digitized information through a MV API, and prompt for validation of extracted contents.

To that end, the client application may be adapted to present various user interfaces to users. Such user interfaces may be provided based on a user's access privileges and/or information sent by the system, and may allow the user to send and receive data. Exemplary client applications may comprise HTML data, images, icons, and/or executable code. The executable code may be composed in JavaScript, ECMAscript, coffeescript, python, Ruby or other programming languages suitable for execution within the client application, or translation into a client application executable form.

An exemplary YOLO CNN may comprise at least one set of layers, each set comprising at least one convolution layer followed by a pooling layer or followed by at least one fully connected layer. As such, incoming pre-processed documentation images are processed according to the weights learned through training. Based on a continuously adjusting model, the YOLO CNN may be used to generate bounding boxes and confidence parameters for field entities embodied in the documentation. For example, the YOLO CNN may be trained to detect and differentiate between a name field, an address field, a medical history field, an insurance number field, a current prescriptions field, and others based on the standard in a client's industry and the desired target data to be extracted. A preferred input for the YOLO CNN may be a source image generated by applying one or more pre-processing steps to a raw image to improve the results of applying the detection and classification model. A preferred output for the YOLO CNN is a prediction tensor comprising bounding box coordinates and corresponding field class label probabilities.

It will be apparent to one of ordinary skill in the art that, in certain embodiments, any of the functionality of a client may be incorporated into the server, and vice versa. Likewise, any functionality of a client application may be incorporated into a browser-based client, and such embodiments are intended to be fully within the scope of this disclosure. For example, a browser-based client application could be configured for offline work by adding local storage capability, and a native application could be distributed for various native platforms via a software layer that executes the browser-based program on the native platform.

In one embodiment, communication between a client application and the server may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol.

Similarly, communications of data between a client device and the server may be continuous and automatic, or may be user-triggered. For example, the user may click a button, causing the client to send data to the server. Alternately, a client application may automatically send updates to the server periodically without prompting by a user. If a client sends data autonomously, the server may be configured to transmit this data, either automatically or on request, to additional clients.

It will be recognized that any other suitable software, hardware or combinations thereof may be used with the exemplary systems and applications disclosed herein. Moreover, such applications may be implemented at any suitable location, such as but not limited to the server, a third party system, at one or more user devices or at a location not shown.

Figure 4:
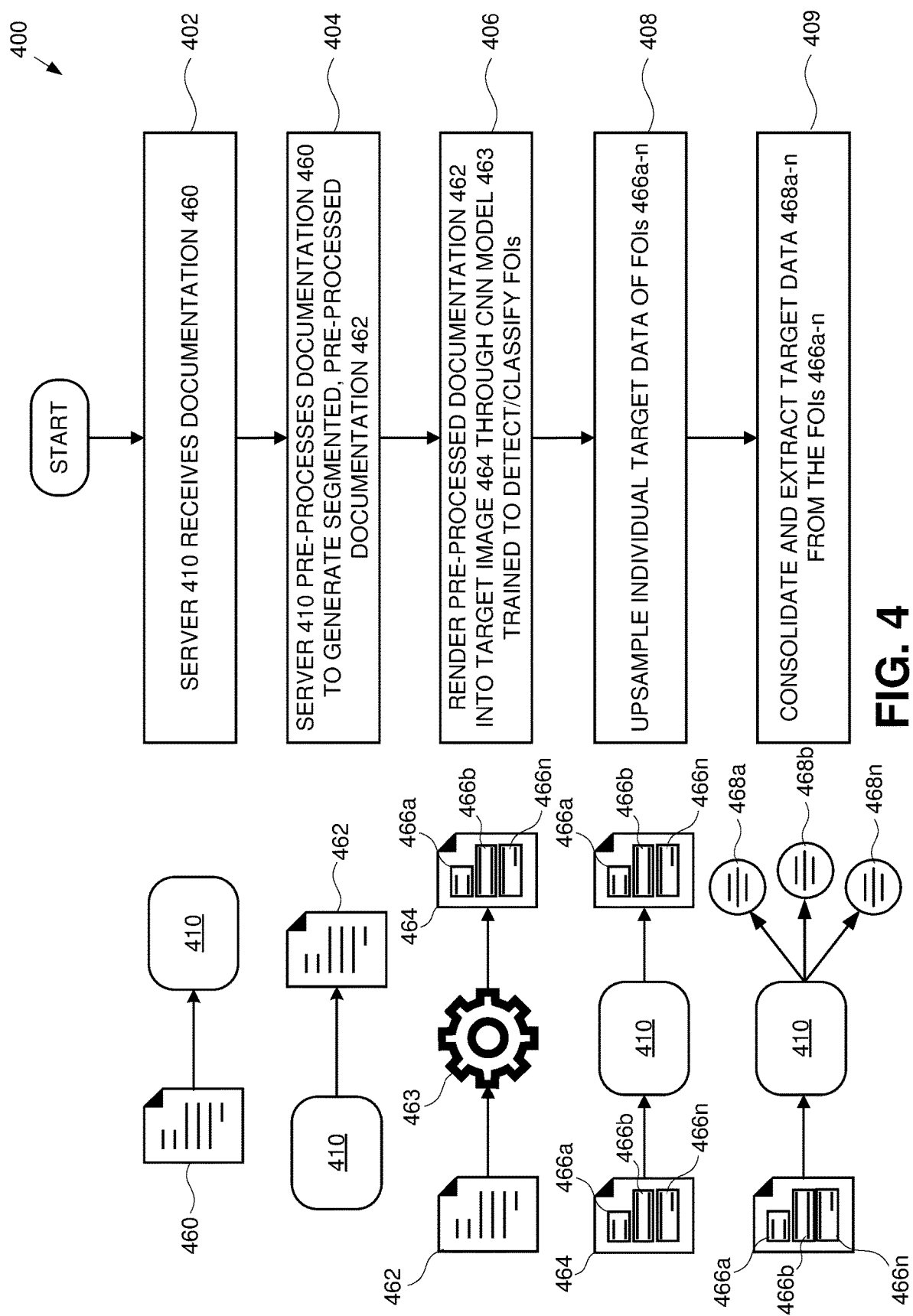
FIG. 4 shows a process flowchart of an exemplary automated document intake and processing method.

Referring to FIG. 4, a process flowchart of an exemplary automated documentation intake and processing method 400 is illustrated. In one embodiment, the method 400 may comprise a first step 402 in which an exemplary server of the intake system ("intake server" 410) receives documentation 460 related to one or more individuals. The intake server 410 may be a general purpose server (see FIG. 1 at 110) or a form processing engine (see FIG. 1 at 160).

In a further step 404, the intake server 410 applies one or more pre-processing methods to the documentation 460. The one or more pre-processing methods may be selected from the group consisting of: denoising (e.g., Gaussian smoothing), deskewing, scaling, mean image, normalization, translation, rotation, affine transformation, perspective transformation, and ROI extraction. Other image processing tasks may also be performed and are within the scope of the exemplary embodiments described herein. Such tasks may be provided by, for example, an open source computer vision library such as OpenCV or ImageMagick. Other open-source or proprietary libraries may also be utilized, such as Intervention (intervention.io), WideImage (wideimage.sourceforge.net), or Amazon Textract. It will be appreciated that pre-processing methods may be employed in order to drastically improve the fidelity and regulate the consistency of documentation 460. Since the documentation 460 may typically comprise handwritten information, pre-processing the documentation 460 serves to streamline subsequent field detection, classification, and data extraction efforts. In other words, this pre-processing renders the documentation 460 into a format suitable to be used as a source image in a trained CNN model 463 for the purpose of generating a target image 464.

Additionally, the documentation 460 is separated into segments according to the input requirements of the CNN model 463. In a typical scenario, a client documentation may comprise multiple completed forms in addition to one or more identification documents. In order to localize content detected thereon, the system may separate the documentation into physical, transactional units (e.g., pages, cards).

In one embodiment, pre-processing of individual cards received from clients may involve a deskewing pre-processing step which may, for example, combine OpenCV and Tesseract to analyze the structure of the card and detect the orientation of individual text written on the card. However, this approach is limited since it is unable to process borderless cards and is unable to accurately process low quality source images. In another embodiment, a Textract-based approach may derive text orientation data directly from bounding boxes generated for textual FOI. Based on the text orientation data, the FOIs of a card may be properly deskewed.

In one or more embodiments, in step 406, the CNN renders the source image into a target image suitable for subsequent consolidation, OCR and validation. Or, the source image(s) embodied in the documentation 460 may be a set of training data used to train a CNN model 463 to detect and classify particular features of the sources images as FOIs 466a-n. As such, the training data represents the ground truth and bounding boxes may be labeled to train field class determination.

FOIs 466a-n may be undifferentiated across a localized pool of documentation. As such, FOIs 466a-n may include non-target data. Detecting, classifying and ultimately extracting FOIs 466a-n by utilizing the CNN model 463 transforms the pre-processed image 462, i.e., the source image, into a target image 464 from which target data can more easily be extracted. A highly accurate extraction process is the result of training the CNN model 463 optimally from a pre-configured set of training data and/or throughout continued supervision and weight adjustment by a qualified intake processor.

The CNN model 463 may be included in the client applications 329 and may be executed through the server 110 and/or the form processing engine 160. The CNN model 463 may be configured according to the desired environment, e.g., trained to recognize FOIs likely to be found in any documentation, for example, documentation utilized in any patient care environment or in any legal services environment. For example, a CNN may be specifically trained to detect and classify specific fields in a standard client questionnaire, such as name, gender, birthdate, address, medical history, drug allergies, work history, past claims, etc. A more complex CNN may be trained to detect and classify multiple types of FOIs in a diversified set of documentation. In any case, FOIs generally comprise non-target data which obscures the target data. Extraction of the non-target data from the FOIs may aid the system 400 to narrow the scope of information in the documentation to primarily focus on including the target data.

In a further step 408, the server 410 may upsample the FOIs 466a-n of the target image 464, improving character fidelity and thus improving the result of further post-processing and extraction of target data stored therein. Each FOI 466 may be associated with a particular class of target data; the non-target data may involve box dimensions, physical features (e.g., shading, cross-hatching in proximity) and field descriptors. For example, a name field may include a bank customer's full name (i.e., target data) but also non-target data, such as the physical constraints (e.g., box in which the bank customer may write his/her name), identification of the information to be provided in the field (e.g., "Full Name:"), instructions (e.g., "Please write legibly in black or blue ink"), and other information.

Once the FOIs are appropriately differentiated, the server 410 may upsample only FOIs with target data in them or both target data and non-target data. Upsampling may improve the results of subsequent OCR and validation steps. Additionally, particular FOIs 466a-n may each be appended with a unique key for discrete identification and storage in a database management system.

In a step 409, the server 410 may consolidate the FOIs 466a-n and an MV API (e.g., GOOGLE Vision API) may be utilized to perform OCR on the FOIs 466a-n and extract target data 468a-n therein. The server 410 may store the target data 468a-n in a database along with the appended unique key associated with the corresponding segment 466a-n in step 408 or a different unique key.

Target data extraction approaches may differ based on the type of documentation received and the FOIs 466a-n contained therein. However, the goal is generally to extract key-value pairs associated with individual FOIs 466a-n. For example, data extraction from tables may be achieved by utilizing OpenCV, which may be utilized to detect tables with borders. A Vision API may then be used to extract data within bordered cells of the table. However, borderless tables may need additional programming for detection and low quality source images may be inaccurately processed. A custom ML model may be created (e.g., through Google Cloud AutoML) to detect table data in known spatial orientations, but this approach would be limited in nature to only a few different types of the same documentation (e.g., variations of invoices from different vendors). A more extensible approach should be considered which can accommodate variation within the documentation. Amazon Textract may be used to detect and extract key-value pairs within FOIs while preserving the spatial orientation of and structural relationships between FOIs.

In yet a further embodiment, a pre-trained named entity recognition (NER) model may be utilized for entity identification within a complex text, such as a lease document or service-level agreement (SLA), and subsequent extraction of target data. This can be achieved through, for example, spaCy API.

Figure 5:
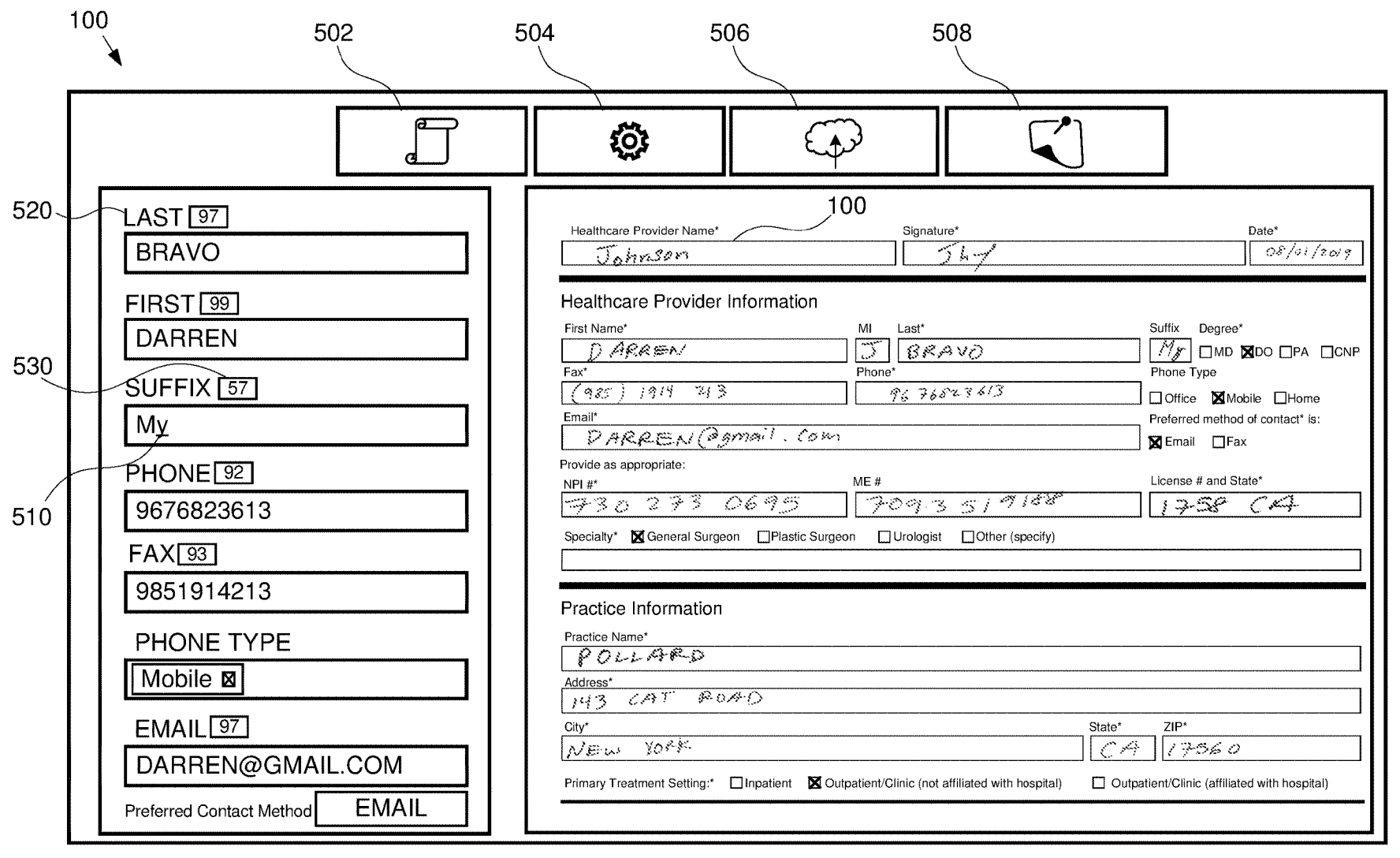

Referring to FIG. 5, an exemplary validation user interface 500 for validating extracted target data 510 is shown. In an optional post-processing step, the server may provide a validation user interface 500 for reviewing and refining the extracted target data 510. Validation may involve manually reviewing the extracted target data 510 and correcting as needed. Receiving corrections to target data may cause the server to not only update the stored target data but also adjust the weights of the YOLO CNN to improve the model's accuracy when detecting and classifying fields in documentation. This may especially be the case for new documentation that slightly or even drastically differs from past documentation. For example, clients represented by different insurance companies may be issued insurance cards having low or high resemblance in structure and little consistency between fields.

The YOLO CNN may associate each extracted data field 520 with a confidence score 530 as calculated by the detection and classification model. An intake processor parsing through the validation user interface 500 may prioritize reviewing extracted data with lower confidence scores. The confidence score 530 may be updated once the corresponding data has been corrected. The validation user interface screen 500 may also provide navigation links 502-508 to allow a user access to various functions, including viewing available templates 502, accessing saved forms 504, upload forms 506, and access reports 508.

Figure 6:
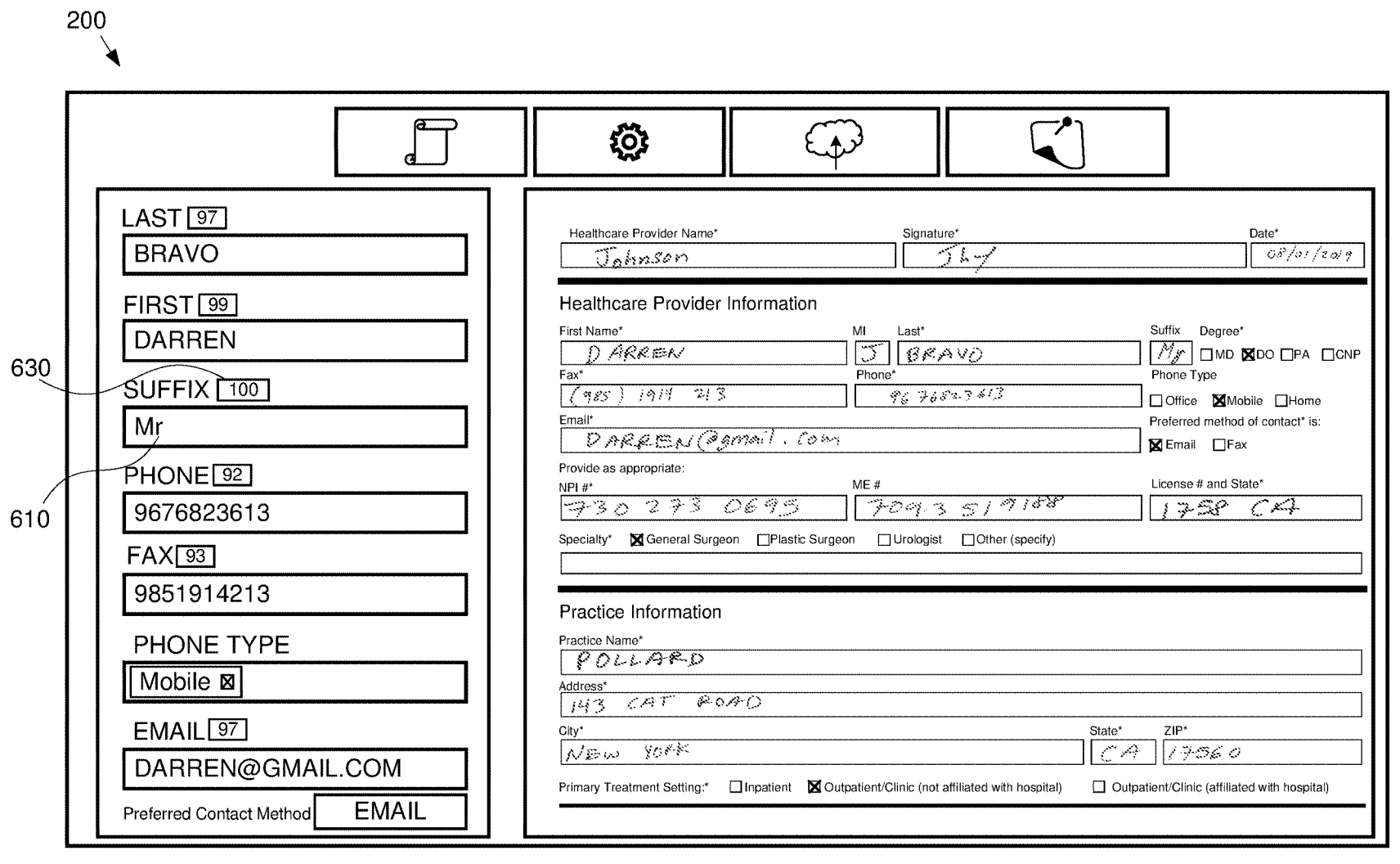

In one example, extracted data 510 may include incorrect information. Correcting such information may increase a related confidence score 530 to a full confidence score 630 as shown in FIG. 6, which shows a validation user interface 600 in which a corrected extracted target data 610 is shown. The confidence score 630 may be increased to 100 to reflect the veracity of the correction.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments. In this regard, directional terminology, such as "vertical," "horizontal," "top," "bottom," "front," "back," "left," "right," etc., is used with reference to the orientation of the drawing (s) being described. Because components of the embodiments can be positioned in a number of different orientations, the directional terminology is used for purposes of illustration and is in no way limiting.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. An automated documentation intake and processing system comprising:
    one or more non-transitory media storing at least one of processor-executable instructions or data or one or more convolutional neural network (CNN) models; and
    at least one processor communicatively coupled to the one or more non-transitory media and configured to:
        receive one or more source images comprising one or more documents related to one or more individuals;
        apply one or more pre-processing methods to render the source image(s) to input image(s);
        apply a you only look once (YOLO) convolutional neural network (CNN) model to render the input image(s) to one or more target image(s), wherein the you only look once (YOLO) convolutional neural network (CNN) model:
            applies one or more filters to the input image(s),
            generates a probability map suggesting one or more fields of interest present in the input image(s),
            classifies the one or more target image(s) as one or more type(s) of document(s), and
            classifies the one or more fields of interest as comprising one or more of non-target data and target data;
        upsample the one or more fields of interest comprising target data or both target data and non-target data; and
        digitize the upsampled fields of interest and extract any target data therein while preserving a spatial relationship between the fields of interest.

2. The system of claim 1, wherein the one or more pre-processing methods are selected from the group consisting of: segmentation, denoising, grayscaling, deskewing, scaling, sharpen, threshold, smoothen, rotation, and affine transformation.

3. The system of claim 1, wherein the you only look once (YOLO) convolutional neural network (CNN) model is trained utilizing a set of predetermined training inputs having one or more known field descriptors.

4. The system of claim 1, wherein the target data is associated with confidence score derived from corresponding probability map data.

5. The system of claim 1, wherein each field of interest and extracted target data is associated with a unique key.

6. The system of claim 1, wherein the processor is additionally configured to receive corrected target data and adjust a corresponding confidence score.

7. The system of claim 6, wherein the processor is additionally configured to update the you only look once (YOLO) convolutional neural network (CNN) model based on received corrected target data according to one or more learning optimization algorithms.

8. The system of claim 1, wherein the one or more form field types are industry-specific and comprises known fields related thereof.

9. A method of automating documentation intake and processing encoded on one or more non-transitory computer-readable media executable by a data processing device having a processor and at least one memory device, comprising:
    receiving one or more source image(s) comprising one or more intake documents associated with one or more individuals;
    applying one or more pre-processing methods to render the source image(s) to input image(s);
    applying a pre-trained you only look once (YOLO) convolutional neural network (CNN) model to render the input image(s) to one or more target image(s), wherein the you only look once (YOLO) convolutional neural network (CNN) model involves:
  applying one or more filters to the input image(s),
  generating a probability map associated with one or more fields of interest present in the input image(s), and
  classifying the one or more target image(s) as one or more type(s) of document(s) and
  classifying the one or more fields of interest as comprising one or more of non-target data and target data;
upsampling the one or more fields of interest comprising target data or both target data and non-target data; and
digitizing the upsampled fields of interest and extracting any target data therein while preserving a spatial relationship between the fields of interest.

10. The method of claim 9, wherein the one or more pre-processing methods are selected from the group consisting of: segmentation, denoising, grayscaling, deskewing, scaling, sharpen, threshold, smoothen, rotation, and affine transformation.

11. The method of claim 9, wherein the target data is associated with a confidence score derived from corresponding probability map data.

12. The method of claim 11, which further involves receiving corrected target data and adjusting a corresponding confidence score.

13. The method of claim 12, which further involves updating the you only look once (YOLO) convolutional neural network (CNN) model based on the corrected target data according to one or more learning optimization algorithms.

* * * * *